US011869692B2

(12) United States Patent
Orimo et al.

(10) Patent No.: US 11,869,692 B2
(45) Date of Patent: Jan. 9, 2024

(54) MAGNETIC MATERIAL, ELECTRONIC COMPONENT, AND METHOD FOR MANUFACTURING MAGNETIC MATERIAL

(71) Applicant: TAIYO YUDEN CO., LTD., Tokyo (JP)

(72) Inventors: Yoko Orimo, Takasaki (JP); Xinyu Li, Takasaki (JP); Shinsuke Takeoka, Takasaki (JP)

(73) Assignee: TAIYO YUDEN CO., LTD, Tokyo (JP)

( * ) Notice: Subject to any disclaimer, the term of this patent is extended or adjusted under 35 U.S.C. 154(b) by 245 days.

(21) Appl. No.: 16/009,018

(22) Filed: Jun. 14, 2018

(65) Prior Publication Data

US 2018/0374619 A1 Dec. 27, 2018

(30) Foreign Application Priority Data

Jun. 26, 2017 (JP) ................................. 2017-124346

(51) Int. Cl.
*H01F 1/33* (2006.01)
*H01F 1/38* (2006.01)
(Continued)

(52) U.S. Cl.
CPC .................. *H01F 1/33* (2013.01); *B22F 1/16* (2022.01); *H01F 1/342* (2013.01); *H01F 1/38* (2013.01);
(Continued)

(58) Field of Classification Search
CPC .......... B22F 1/02; B22F 2999/00; B22F 3/10; B22F 3/02; B22F 2207/07; B22F 2998/10;
(Continued)

(56) References Cited

U.S. PATENT DOCUMENTS

2010/0239879 A1* 9/2010 Kawano .................... H01F 1/33 428/570
2012/0082844 A1* 4/2012 Takahashi ................. B22F 1/16 428/336
(Continued)

FOREIGN PATENT DOCUMENTS

JP 2006097123 A 4/2006
JP 2007092120 A 4/2007
(Continued)

OTHER PUBLICATIONS https://www.ks.uiuc.edu/Research/silica/ obtained on May 2022.*
(Continued)

*Primary Examiner* — Holly Rickman
*Assistant Examiner* — Lisa Chau
(74) *Attorney, Agent, or Firm* — Law Office of Katsuhiro Arai

(57) ABSTRACT

A magnetic material includes a soft magnetic metal grain containing Fe, and a multilayer oxide film covering the surfaces of the soft magnetic metal grain. The multilayer oxide film has a first oxide layer of crystalline nature containing Fe, and a second oxide layer of amorphous nature containing Si. In an embodiment, the silicon oxide film of amorphous nature is formed by dripping, divided into multiple sessions, a treatment solution containing TEOS (tetraethoxy silane), ethanol, and water into a mixed solution containing the soft magnetic metal grain, ethanol, and ammonia water, to mix the solutions.

7 Claims, 9 Drawing Sheets

(51) Int. Cl.

*H01F 1/34* (2006.01)
*H01F 3/02* (2006.01)
*H01F 3/08* (2006.01)
*B22F 1/16* (2022.01)
*B22F 5/00* (2006.01)

(52) U.S. Cl.

CPC ................. *H01F 3/02* (2013.01); *H01F 3/08* (2013.01); *B22F 5/00* (2013.01); *B22F 2207/07* (2013.01); *B22F 2301/35* (2013.01); *B22F 2302/256* (2013.01); *B22F 2998/10* (2013.01); *B22F 2999/00* (2013.01); *C22C 2202/02* (2013.01)

(58) Field of Classification Search

CPC ........ B22F 5/00; B22F 2201/01; B22F 9/002; B22F 2301/35; B22F 2302/256; B22F 1/16; C22C 2202/02; H01F 1/342; H01F 1/38; H01F 3/02; H01F 3/08; H01F 1/00; H01F 1/0054; H01F 1/0063; H01F 1/14733–1475; H01F 1/14766; H01F 1/14783; H01F 1/20–24; H01F 1/33–344; H01F 1/36

See application file for complete search history.

(56) References Cited

U.S. PATENT DOCUMENTS

2014/0375413 A1 12/2014 Kim et al.
2018/0005739 A1* 1/2018 Orimo .................... C01B 33/12

FOREIGN PATENT DOCUMENTS

| | | | | |
|---|---|---|---|---|
| JP | 2012094804 | A | | 5/2012 |
| JP | 2014060183 | A | * | 4/2014 |
| JP | 2015126047 | A | | 7/2015 |
| JP | 2015144238 | A | | 8/2015 |
| KR | 20140148110 | A | | 12/2014 |
| WO | WO-2015108059 | A1 | * | 7/2015 |

OTHER PUBLICATIONS

English machine translation of JP 2014060183 A (Kamiya et al.) (2014).*

A Notification of Reason for Refusal issued by Korean Intellectual Property Office, dated Mar. 25, 2019, for Korean counterpart application No. 1020180068640. (7 pages).

* cited by examiner

FIG. 12
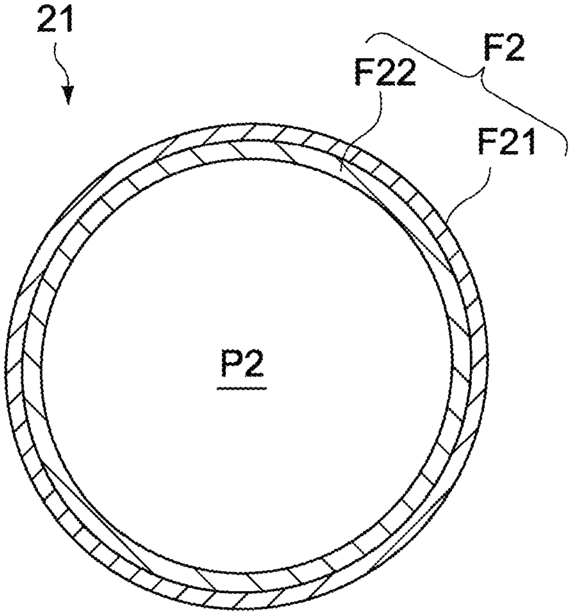
FIG. 13]
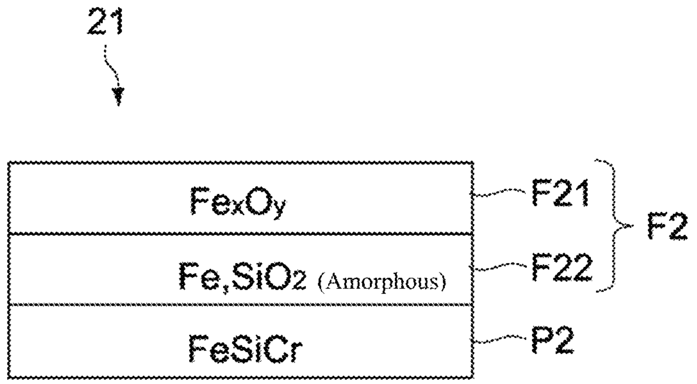

MAGNETIC MATERIAL, ELECTRONIC COMPONENT, AND METHOD FOR MANUFACTURING MAGNETIC MATERIAL

BACKGROUND

Field of the Invention

The present invention relates to a magnetic material used for constituting an electronic component such as inductor, etc., and a method for manufacturing such magnetic material.

Description of the Related Art

Electronic components such as inductors, choke coils, transformers, etc., have a magnetic body that serves as a magnetic core, and a coil formed inside or on the surface of this magnetic body. Materials generally used for magnetic bodies include NiCuZn ferrite and other ferrite materials, for example.

There has been a demand, in recent years, for electronic components of these types that offer higher current capacities, and to satisfy this demand, switching the materials used for magnetic bodies from ferrites that have been traditionally used for this application, to metal materials, is being considered. FeSiCr alloy, FeSiAl alloy, etc., are known as such metal materials, and, for example, Patent Literature 1 discloses a powder magnetic core constituted by a FeSiCr soft magnetic alloy powder whose alloy phases are bonded to one another via an oxide phase that contains Fe, Si, and Cr.

On the other hand, metal magnetic materials face a call for further improvement in electrical insulation properties because, although their saturated magnetic flux densities are higher than those of ferrites, their volume resistivities are lower compare to the traditional ferrites. For example, Patent Literature 2 discloses a soft magnetic powder magnetic core constituted by soft magnetic metal grains whose primary component is Fe, and a glass part present between the grains. The glass part is formed by softening a low-melting-point glass material by heating it under pressure. As its melting point is low, the low-melting-point glass material undergoes a diffusion reaction between the soft magnetic metal grains when heated, so that apparently it can fill voids that cannot be completely filled by the oxide part covering the surfaces of the soft magnetic metal grains.

BACKGROUND ART LITERATURES

[Patent Literature 1] Japanese Patent Laid-open No. 2015-126047

[Patent Literature 2] Japanese Patent Laid-open No. 2015-144238

[Patent Literature 3] Japanese Patent Laid-open No. 2007-92120

SUMMARY

However, filling the gaps between soft magnetic metal grains with glass is difficult, which presents a problem of insufficient insulation stability. Additionally, even if the gaps between soft magnetic metal grains can be filled with glass, the resulting instability of the oxidization reaction of soft magnetic metal grains may cause the opposite effect of lower insulation properties.

In light of the situations described above, an object of the present invention is to provide a magnetic material that can achieve improved insulation properties, and a method for manufacturing such magnetic material.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the magnetic material pertaining to an embodiment of the present invention comprises soft magnetic metal grains containing Fe, and a multilayer oxide film covering the surfaces of the soft magnetic metal grains.

The multilayer oxide film has a first oxide layer of crystalline nature containing Fe, and a second oxide layer of amorphous nature containing Si.

This way, a magnetic material offering excellent insulation properties can be obtained.

The first oxide layer may be present between the surface of the soft magnetic metal grain and the second oxide layer.

In this case, the multilayer oxide film may further have a third oxide layer containing Fe and Si and covering the second oxide layer.

The multilayer oxide film may further have a fourth oxide layer containing Fe and O and covering the third oxide layer.

The soft magnetic metal grains may be constituted by a pure iron powder, for example.

On the other hand, the second oxide layer may be present between the surface of the soft magnetic metal grain and the first oxide layer.

In this case, the second oxide layer may further contain Fe.

In the magnetic material having the aforementioned constitution, the soft magnetic metal grain is a soft magnetic alloy grain containing Fe, element L (where element L is Si, Zr or Ti), and element M (where element M is not Si, Zr, or Ti, and oxidizes more easily than Fe), for example.

The electronic component pertaining to an embodiment of the present invention comprises a magnetic core constituted by an aggregate of the aforementioned magnetic material.

The method for manufacturing magnetic material pertaining to an embodiment of the present invention includes forming a silicon oxide film of amorphous nature on the surfaces of soft magnetic metal grains containing Fe.

The soft magnetic metal grains are heated to a first temperature of 900° C. or below in a reducing atmosphere.

According to the aforementioned method, a multilayer oxide film containing an oxide layer of crystalline nature containing Fe and an oxide layer of amorphous nature containing Si, forms on the surfaces of soft magnetic metal grains. This way, a magnetic material offering excellent insulation properties can be obtained.

The aforementioned method for manufacturing magnetic material may further include heating the soft magnetic metal grains to a second temperature of 700° C. or below in a reducing atmosphere or oxidizing atmosphere.

The method for manufacturing magnetic material pertaining to another embodiment of the present invention includes forming a silicon oxide film of amorphous nature on the surfaces of soft magnetic metal grains containing Fe.

The soft magnetic metal grains are heated to a third temperature of 400° C. or lower in an oxidizing atmosphere.

The aforementioned manufacturing method may further include heating the soft magnetic metal grains to a second temperature of 700° C. or below in a reducing atmosphere or oxidizing atmosphere.

The aforementioned formation of silicon oxide film may include dripping, divided into multiple sessions, a treatment solution containing TEOS (tetraethoxy silane), ethanol, and water into a mixed solution containing the aforementioned soft magnetic metal grains, ethanol, and ammonia water, to mix the solutions, and then drying the soft magnetic metal grains.

This way, a silicon oxide film of amorphous nature can be formed, to a uniform thickness, on the surfaces of soft magnetic metal grains.

The soft magnetic metal grains are not limited in any way, and they may be pure iron or soft magnetic alloy grains. Such soft magnetic alloy grains contain, for example, Fe, element L (where element L is Si, Zr, or Ti), and element M (where element M is not Si, Zr, or Ti, and oxidizes more easily than Fe).

The method for manufacturing magnetic material pertaining to another embodiment of the present invention includes dripping, divided into multiple sessions, a treatment solution containing TEOS (tetraethoxy silane), ethanol, and water into a mixed solution containing soft magnetic metal grains containing Fe, ethanol, and ammonia water, to mix the solutions, thereby forming a silicon oxide film of amorphous nature on the surfaces of the soft magnetic metal grains.

According to the present invention, a magnetic material offering excellent insulation properties can be obtained.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 12 is a cross-sectional view providing a schematic illustration of the structure of the magnetic material pertaining to the second embodiment of the present invention.

FIG. 13 is a schematic view explaining the structure of the multilayer oxide film in the magnetic material.

DESCRIPTION OF THE SYMBOLS

Figure 1:
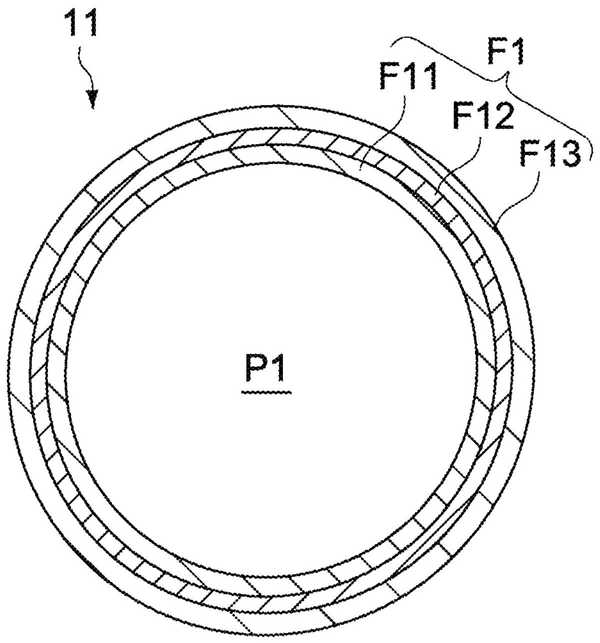
FIG. 1 is a cross-sectional view providing a schematic illustration of the structure of the magnetic material pertaining to the first embodiment of the present invention.

10—Magnetic powder
11, 21—Magnetic grain
100, 100', 200—Magnetic member
F1, F1', F2, F20—Multilayer oxide film
F11, F21—First oxide layer
F12, F22—Second oxide layer
F13, F23—Third oxide layer
F14, F24—Fourth oxide layer
P1, P2—Soft magnetic metal grain

DETAILED DESCRIPTION OF EMBODIMENTS

Embodiments of the present invention are explained below by referring to the drawings.

First Embodiment

[Magnetic Material]

FIG. 1 is a cross-sectional view providing a schematic illustration of the structure of the magnetic material pertaining to the first embodiment of the present invention.

The magnetic material in this embodiment is constituted by the magnetic grains 11 shown in FIG. 1. The magnetic grain 11 comprises a soft magnetic metal grain P1 and a multilayer oxide film F1 covering the surface of the soft magnetic metal grain P1.

The soft magnetic metal grains P1 are metal grains containing at least Fe, and in this embodiment, constituted by a pure iron powder such as carbonyl iron powder, etc. The median grain size of the soft magnetic metal grain P1 is not limited in any way, and in this embodiment, the median grain size d50 (median diameter) based on volume-based grain size is 2 μm to 30 μm, for example. The d50 of the soft magnetic metal grain P1 is measured, for example, with a grain size/granularity distribution measuring device that utilizes the laser diffraction/scattering method (such as Microtrac by Nikkiso).

Figure 2:
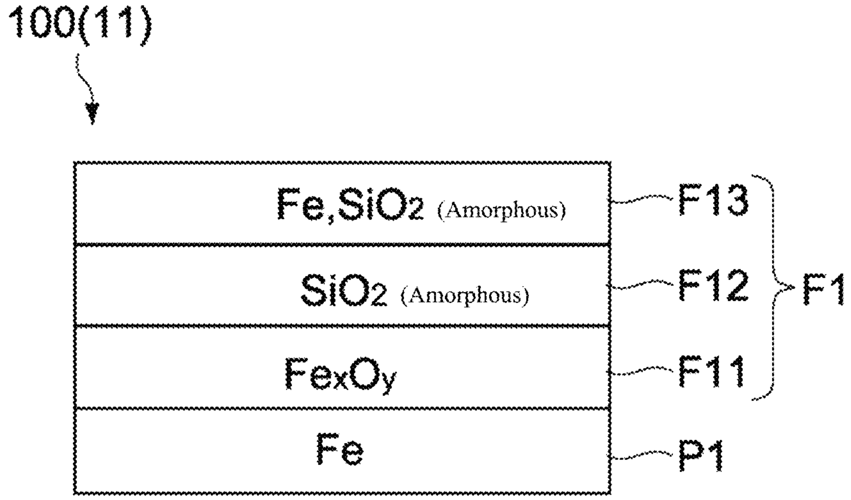
FIG. 2 is a schematic view explaining the structure of the multilayer oxide film in the magnetic material.

FIG. 2 is a schematic view explaining the layer structure of the multilayer oxide film F1.

The multilayer oxide film F1 is constituted by an oxide film of three-layer structure that includes first to third oxide layers F11 to F13, where the first oxide layer F11, second oxide layer F12, and third oxide layer F13 are formed, in this order, starting from the layer closest to the soft magnetic metal grain P1 (that is, from the inner side).

The first oxide layer F11 is present between the soft magnetic metal grain P1 and the second oxide layer F12. The first oxide layer F11 is constituted by a crystalline oxide ($Fe_xO_y$) whose representative component is Fe (iron) (the X-ray intensity ratio of Fe is 50% or higher) (the X-ray intensity represents a mass or weight concentration of the component). An oxide of Fe is typically $Fe_3O_4$ belonging to the class of magnetic bodies, or $Fe_2O_3$ belonging to the class of non-magnetic bodies, among others. The first oxide layer F1 is typically a natural oxide film formed on the surface of the soft magnetic metal grain P1. The first oxide layer F11 typically has a thickness smaller than the thickness of the second oxide layer F12. The thickness of the first oxide layer F11 is not limited in any way, and is 0.5 nm to 10 nm, for example.

The second oxide layer F12 is constituted by an amorphous oxide ($Si_xO_y$) whose representative component is Si (the X-ray intensity ratio of Si is 50% or higher). An oxide of Si is typically $SiO_2$. The second oxide layer F12 may contain an element other than Si or oxygen (O) (such as Fe). The thickness of the second oxide layer F12 is 1 nm to 30 nm, or preferably 10 nm to 25 nm.

The third oxide layer F13 covers the second oxide layer F12. The third oxide layer F13 is constituted by an oxide whose representative components are Fe and Si (the total sum of the X-ray intensity ratios of Fe and Si is 50% or higher). The third oxide layer F13 is typically constituted by a phase formed by diffusion, and deposition in amorphous $SiO_2$, of Fe being a constitution component of the soft magnetic metal grain P1. The third oxide layer F13 may contain elements other than Fe, Si, and O. Fe, Si, and O contained in the third oxide layer F13 may exist in the form of $Fe_2SiO_4$, for example. The third oxide layer F13 is typically formed to a thickness greater than the thickness of the second oxide layer F12, but this is not always the case and it may be formed to a thickness equal to or smaller than the thickness of the second oxide layer F12.

An oxide layer whose component ratios of Fe and Si are low, may be present at the interfaces of the first to third oxide layers F11 to F13. For example, an area where the X-ray intensity ratio of Fe or Si, or of the total sum of Fe and Si, is less than 50%, may exist at the interface between the first oxide layer F11 and the second oxide layer F12, or at the interface between the second oxide layer F12 and the third oxide layer F13.

Also, the interfaces of the first to third oxide layers F11 to F13 do not necessarily manifest clearly. A concentration distribution of Fe or Si may exist between the second oxide layer F12 and the third oxide layer F13. For example, Fe, which is a component element of the third oxide layer F13, is an element that diffuses from the soft magnetic metal grain P1, and therefore the third oxide layer F13 has a concentration gradient characterized by a Fe concentration gradually rising toward its surface. Similarly, the second oxide layer F12 may have a concentration gradient characterized by a Si concentration gradually decreasing toward the third oxide layer F13.

A method for measuring the chemical composition of the multilayer oxide film F1 is as follows, for example. First, the magnetic member 100 is fractured or otherwise its cross-section is exposed. Next, the cross-section is smoothed by ion milling, etc., and captured with a scanning electron microscope (SEM). Then, the part corresponding to the multilayer oxide film F1 is calculated by the ZAF method based on energy diffusion X-ray analysis (EDS).

Figure 3:
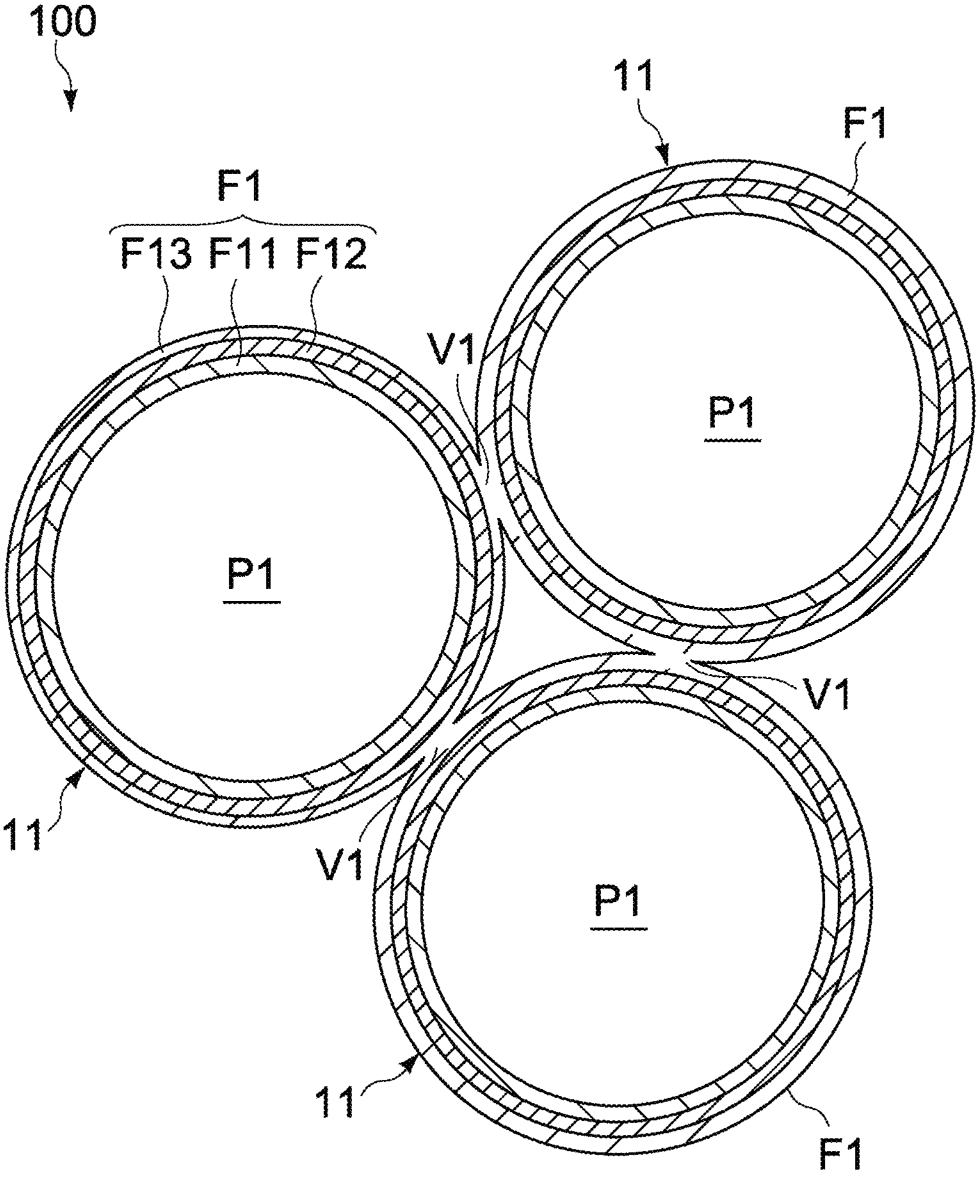
FIG. 3 is a cross-sectional view providing a schematic illustration of an example of microstructure of a magnetic member constituted by an aggregate of the magnetic material.
Figure 4:
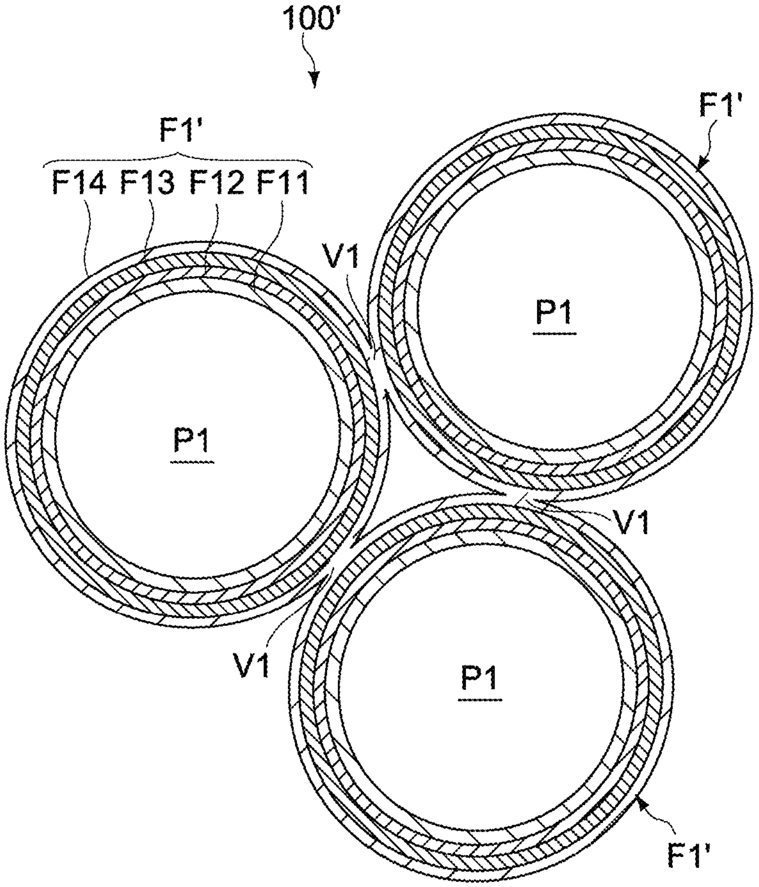
FIG. 4 is a cross-sectional view providing a schematic illustration of another constitutional example of microstructure of a magnetic member constituted by an aggregate of the magnetic material.

The magnetic grains 11 are used as a material powder for manufacturing magnetic members that constitute magnetic cores in coils, inductors, etc., for example. FIGS. 3 and 4 are cross-sectional views, each providing a schematic illustration of microstructure of a magnetic member 100, 100' constituted by an aggregate of the magnetic grains 11.

Figure 5:
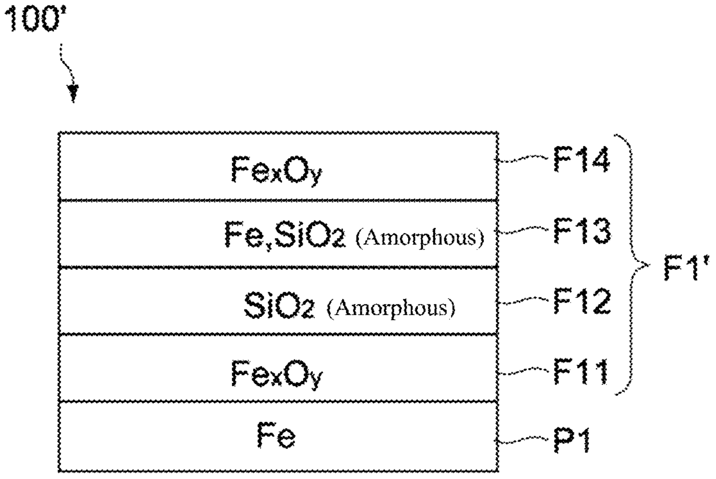
FIG. 5 is a schematic view explaining the structure of the multilayer oxide film in the magnetic material shown in FIG. 4.

As described below, the magnetic member 100 shown in FIG. 3 is produced by heat-treating the magnetic grains 11 in a reducing atmosphere, while the magnetic member 100' shown in FIG. 4 is produced by heat-treating the magnetic grains 11 in an oxidizing atmosphere. The multilayer oxide film F1' of the magnetic member 100' is different from the multilayer oxide film F1 of the magnetic member 100 in layer structure, in that it further has a fourth oxide layer F14 covering the third oxide layer F13. The fourth oxide layer F14 is constituted by an oxide whose representative components are Fe and O (the total sum of the X-ray intensity ratios of Fe and O is 50% or higher). FIG. 5 is a schematic view explaining the layer structure of the multilayer oxide film F1'.

As shown in FIGS. 3 and 4, the magnetic members 100, 100' are each constituted, as a whole, by an aggregate of many originally independent magnetic grains 11 that are bonded together, or a powder compact formed by many magnetic grains 11. FIGS. 3 and 4 depict areas near the interfaces of three magnetic grains 11 in a closeup view.

The adjacent magnetic grains 11 are bonded together primarily via the multilayer oxide film F1, F1' around the individual soft magnetic metal grains P1, and the magnetic member 100, 100' having a specific shape is constituted as a result. Some adjacent soft magnetic metal grains P1 may be bonded together at their respective metal parts. Regardless of whether the bonding is via the multilayer oxide film F1, F1', or at the respective metal parts, it is desirable that effectively no matrix constituted by organic resin is contained, for the purpose of increasing the filling rate of the magnetic grains 11 and improving the magnetic permeability. The term "matrix" may refer to a continuous structure developed often as a bonding structure to bond grains.

This way, what few voids that remain between the magnetic grains 11 that have been bonded together in the presence of effectively no matrix constituted by organic resin, can be impregnated with an organic resin that does not affect the bonding. As a result, the insulation properties of the magnetic grains 11 can be improved, and the magnetic high-frequency properties of the magnetic member 100, 100' can be improved, which is more desirable. Normal organic resins cannot withstand the high temperatures needed to produce bonds via the multilayer oxide film F1, F1'. What few voids that remain between the magnetic grains 11 can be impregnated with an organic resin that does not affect the bonding, by producing bonds via the multilayer oxide film F1, F1', followed by cooling as deemed appropriate, and then impregnating an organic resin that does not affect the bonding. The term "a component not affecting the bonding" may refer to a condition where the grains remain bonded without the component, e.g., the component may have a decomposition temperature lower than the heat treatment (or sintering) temperature of the grains for bonding the grains so that the component is provided after the bonding of the grains is complete by the heat treatment.

Additionally, independent magnetic grains 11 as shown in FIG. 1 that are not bonded together via the multilayer oxide film F1, F1' as shown in the examples of FIGS. 3 and 4, or groups of small numbers of magnetic grains 11 that have been bonded together at their respective metal parts, may be bonded through a matrix constituted by an organic resin. When a matrix constituted by an organic resin is used for bonding, the resulting bonding differs from when the bonding is via the multilayer oxide film F1, F1', because this organic resin cannot withstand the high temperatures needed to produce bonds via the multilayer oxide film F1, F1' as shown in FIGS. 3 and 4. The magnetic member 100, 100' constituted by an aggregate of the magnetic grains 11 thus obtained, cannot have a very high filling rate; however, it offers good insulation property and can also be manufactured inexpensively because its manufacturing process does not require high temperatures.

The magnetic member 100, 100' has bonding parts V1 that connect the magnetic grains 11 (soft magnetic metal grains P1) together, as shown in FIGS. 3 and 4. A bonding part V1 is constituted by a part of the third oxide layer F13 in FIG. 3, while it is constituted by a part of the fourth oxide layer F14 in FIG. 4. Presence of the bonding parts V1 improves the mechanical strength and insulation property of the magnetic member 100, 100'.

Preferably the magnetic member 100, 100' is such that, throughout its entire expanse, the magnetic grains 11 are bonded together in a manner via the bonding parts V1; however, it may have some areas where the magnetic grains 11 are bonded together not via the bonding parts V1. Furthermore, the magnetic member 100, 100' may have some areas having a state where neither the bonding parts V1 nor bonding parts other than the bonding parts V1 (bonding parts between soft magnetic metal grains P1) exist and the magnetic grains 11 are only in contact with or in close proximity to each other physically. Furthermore, the magnetic member 100, 100' may have some voids. Furthermore, the magnetic member 100, 100' may have an organic resin filled in these voids that may be present therein. Presence of bonding parts between the magnetic grains 11 can be visually confirmed on a SEM observation image (photograph of cross-section) enlarged at a magnification of approx. 3000 times, for example. It should be noted that presence of the bonding parts between soft magnetic metal grains P1 improves the magnetic permeability.

Figure 6:
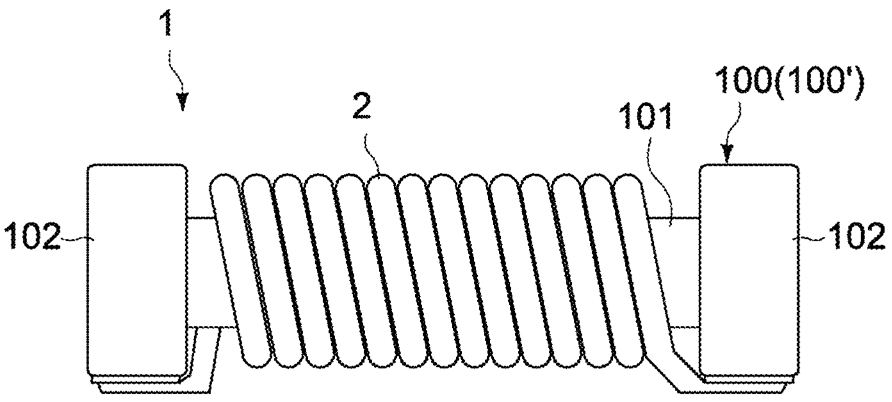
FIG. 6 is a rough constitutional view illustrating an example of application of the magnetic member.

FIG. 6 is a rough constitutional view illustrating an example of application of the magnetic member 100, 100'. As shown in FIG. 6, the magnetic member 100, 100' is constituted as a magnetic core of a coil-type chip inductor 1. The magnetic member 100, 100' has an axial winding core part 101 around which a coil 2 is wound, and a pair of flange parts 102 electrically connected to both ends of the coil 2. The shape of the magnetic member 100, 100' is not limited to the example shown in FIG. 6, and it may be changed as deemed appropriate according to the mode or specification of the coil component, among others.

[Method for Manufacturing Magnetic Grains]

Next, the method for manufacturing the magnetic grains 11 is explained.

The multilayer oxide film F1 of the magnetic grain 11 shown in FIGS. 1 and 2 is formed on the surface of the soft magnetic metal grain P1 in the material grain stage before the magnetic member 100, 100' is formed. The multilayer oxide film F1 is formed through a pre-treatment in which a silicon oxide film of amorphous nature that will constitute the second oxide layer F12 is formed on the surface of the soft magnetic metal grain P1, and a treatment (first heat treatment) in which the soft magnetic metal grain P1 having the silicon oxide film of amorphous nature formed on its surface is heated to a temperature of 900° C. or below in a reducing atmosphere.

(Pre-Treatment)

In the pre-treatment step, a silicon oxide film of amorphous nature (amorphous $SiO_2$ film) that will constitute the second oxide layer F12 is formed on the surface of the soft magnetic metal grain P1 (first oxide layer F11). The method of pre-treatment is not limited in any way, and a coating process using the sol-gel method is employed in the mode pertaining to this embodiment.

Under the sol-gel method, typically a treatment solution containing TEOS (tetraethoxy silane, $Si(OC_2H_5)_4$), ethanol, and water is mixed into a mixed solution containing material grains (soft magnetic metal grains), ethanol, and ammonia water, and then the mixture is agitated, after which the material grains are filtered out/separated and then dried; this way, a coating layer constituted by a $SiO_2$ film can be formed on the surface of the material grains.

However, mixing the treatment solution into the mixed solution all at once causes homogeneous nucleation to become dominant. This means that the $SiO_2$ grains undergo nucleus formation/grain growth in the solution and form aggregates and these aggregates attach to the surface of the material grains, and this prevents stable formation of a coating layer.

Figure 7:
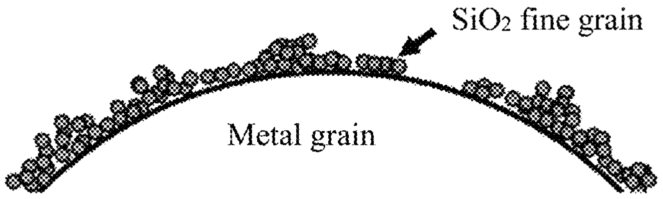
FIG. 7 is a cross-sectional view providing a schematic illustration of the state of $SiO_2$ fine grains formed on the surface of a soft magnetic metal grain.

FIG. 7 is a cross-sectional view providing a schematic illustration of the state of $SiO_2$ fine grains formed on the surface of a metal grain when the soft magnetic metal grains, ethanol, ammonia water, TEOS, and water have been mixed together all at once. When $SiO_2$ fine grains are formed by the aforementioned mixed solution preparation process, a high-resolution TEM observation of the $SiO_2$ fine grains obtained as a result of homogeneous nucleation and grain growth, at a magnification of approx. 50000 times, shows interference patterns that look like fringes, for example. These interference patterns represent lattice fringes of crystal, and the fact that these interference patterns are observed means the aggregates obtained by this treatment method are crystalline.

Accordingly, in this embodiment, the treatment solution is dripped into the mixed solution over multiple times (i.e., divided into multiple sessions), as a pre-treatment, to suppress homogeneous nucleation of $SiO_2$ grains. This way, heterogeneous nucleation becomes dominant on the surface of the material grain, and therefore a coating layer (amorphous $SiO_2$ film) of roughly uniform thickness can be formed on the surface of the material grain in a stable manner.

Figure 8:
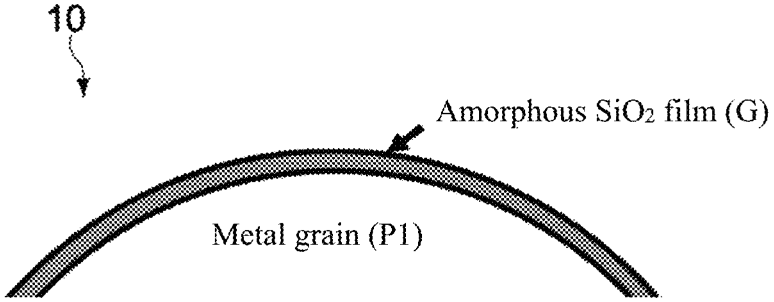
FIG. 8 is a cross-sectional view of a grain providing a schematic illustration of an amorphous $SiO_2$ film formed on the surface of a soft magnetic metal grain.

FIG. 8 is a cross-sectional view of grain providing a schematic illustration of a coating layer G that has been formed on the surface of a soft magnetic metal grain P1 according to the method employed in this embodiment. A high-resolution TEM observation of the coating layer G at a magnification of approx. 50000 times does not show interference patterns that look like fringes, for example. The fact that these interference patterns are not observed means the coating layer G is amorphous. In general, the insulation resistance value of amorphous $SiO_2$ is higher than the resistance value of crystalline Sift by two to three orders of magnitude. Accordingly, high dielectric strength properties can be achieved even when the thickness of the coated $SiO_2$ film is 1 nm, for example.

It should be noted that the thickness of the coating layer G can be adjusted in any way, within a range of 1 nm to 100 nm, for example, according to the final concentration of the treatment solution containing TEOS which is dripped into the mixed solution containing soft magnetic metal grains P1.

By applying the aforementioned heat treatment (first heat treatment) to the magnetic powder 10 (refer to FIG. 8) constituted by the soft magnetic metal grain P1 having the coating layer G formed on its surface, the third oxide layer F13 is formed on the surface of the coating layer G (second oxide layer F12).

(First Heat Treatment)

Under the first heat treatment, the magnetic powder 10 is heated to a temperature of 900° C. or below for a prescribed amount of time in a reducing atmosphere. The coating layer G remains on the surface of the soft magnetic metal grain P1 (first oxide layer F11) as the second oxide layer F12. The third oxide layer F13 is formed when Fe, which is a composition element of the soft magnetic metal grain P1, diffuses onto the surface of the second oxide layer F12 via the first oxide layer F11 and second oxide layer F12.

The reducing gas used in the first heat treatment may be hydrogen ($H_2$), carbon monoxide (CO), hydrogen sulfide ($H_2S$), etc., but hydrogen is preferred. The heat treatment furnace is not limited in any way, either, and while a rotary kiln or other continuously operable oven is preferred, a rotary hearth, electric furnace, etc., can also be applied. In the first heat treatment using a rotary kiln, etc., a flow of magnetic powder is created so that bonding parts between magnetic powder grains are effectively not produced. The heat treatment temperature, which is not limited in any way so long as it satisfies the temperature requirement for the formation of the third oxide layer F13, is typically 900° C. or below, and preferably 600 to 800° C. The treatment time can be set in any way as deemed appropriate according to the heat treatment temperature, such as 1 hour when the heat treatment temperature is 600 to 800° C.

As the first heat treatment is implemented in a reducing atmosphere, oxidization-triggered spinel formation of Fe is suppressed in the third oxide layer F13, and therefore crystallization of the third oxide layer F13 is prevented. As a result, the third oxide layer F13 remains in amorphous (non-crystalline) state, just like the second oxide layer F12. Also, applying the heat treatment in a reducing atmosphere keeps the thickness of the third oxide layer F13 to only between 30 and 50 nm, which means that, compared to the third oxide layer F13 of 100 nm or thicker that would be formed when the heat treatment is applied in an oxidizing atmosphere, higher magnetic permeability is ensured, and the dielectric strength can also be improved over the levels achieved by the second and third oxide film layers F12, F13 that are in amorphous state.

Figure 9:
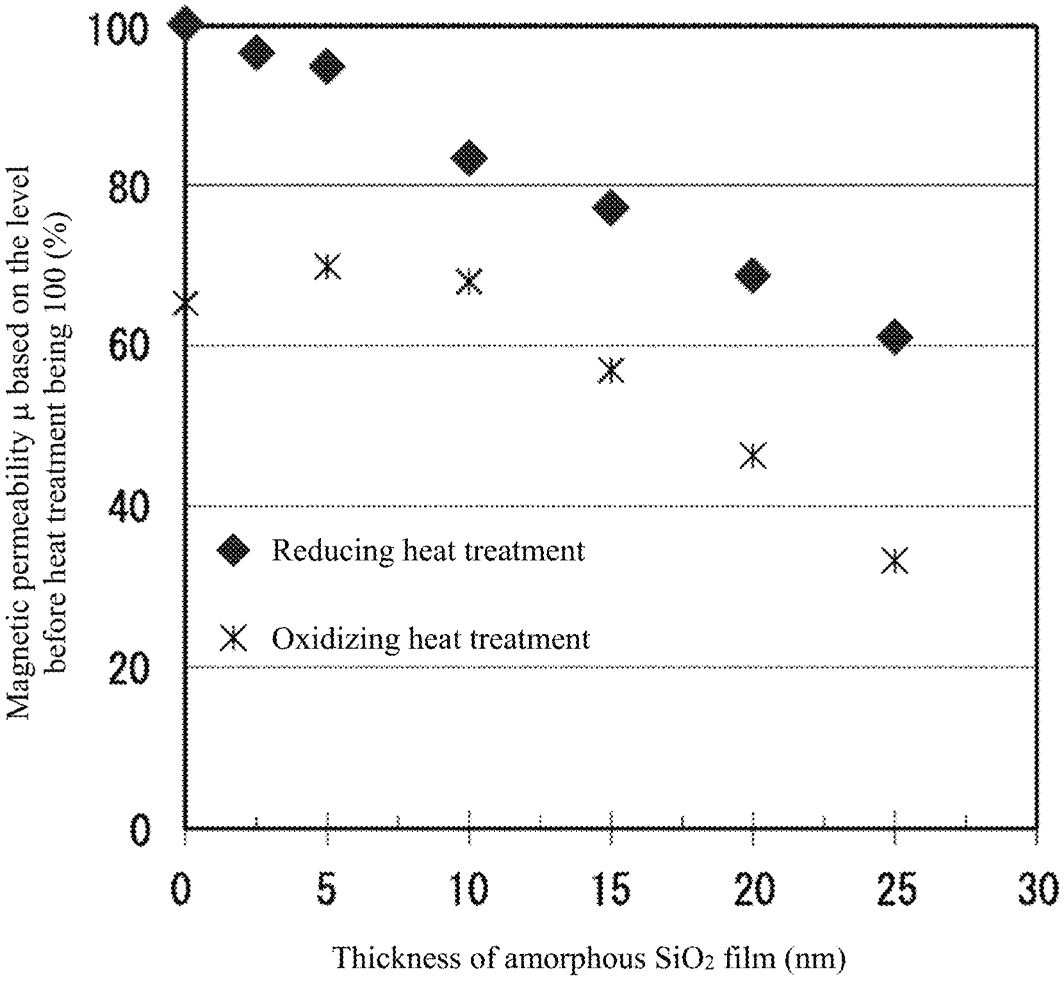
FIG. 9 is a graph showing experimental results illustrating the relationship between the thickness of the amorphous $SiO_2$ film and the magnetic permeability of magnetic material.

The inventors prepared multiple magnetic powder samples, each having a coating layer G (second oxide layer F12) of different thickness, and heat-treated each magnetic powder sample in a hydrogen atmosphere (reducing atmosphere) at 800° C. and measured its magnetic permeability, and also heat-treated each sample in an atmosphere (oxidizing atmosphere) at 800° C. and measured its magnetic permeability, both using the same method. The results are shown in FIG. 9. In the figure, the horizontal axis indicates the thickness of the second oxide layer F12 (amorphous $SiO_2$ film), while the vertical axis indicates the magnetic permeability of each magnetic powder sample based on the magnetic permeability of each magnetic powder sample before the heat treatment being 100%.

As shown in FIG. 9, there is a trend for the thickness of the second oxide layer F12 to increase when the drop in the magnetic permeability of the magnetic powder (magnetic grains) compared to the level before the heat treatment increases; compared to when the heat treatment is applied in an oxidizing atmosphere, however, the rate of drop in magnetic permeability is lower when the heat treatment is applied in a reducing atmosphere, regardless of the thickness of the second oxide layer F12. This is because, when the heat treatment is applied in an oxidizing atmosphere, the third oxide layer F13 becomes as thick as 100 nm or thicker by taking in the second oxide film while the oxidization of the magnetic grains themselves is progressing markedly, and the thickness of the entire oxide layer increases as a result.

Figure 10:
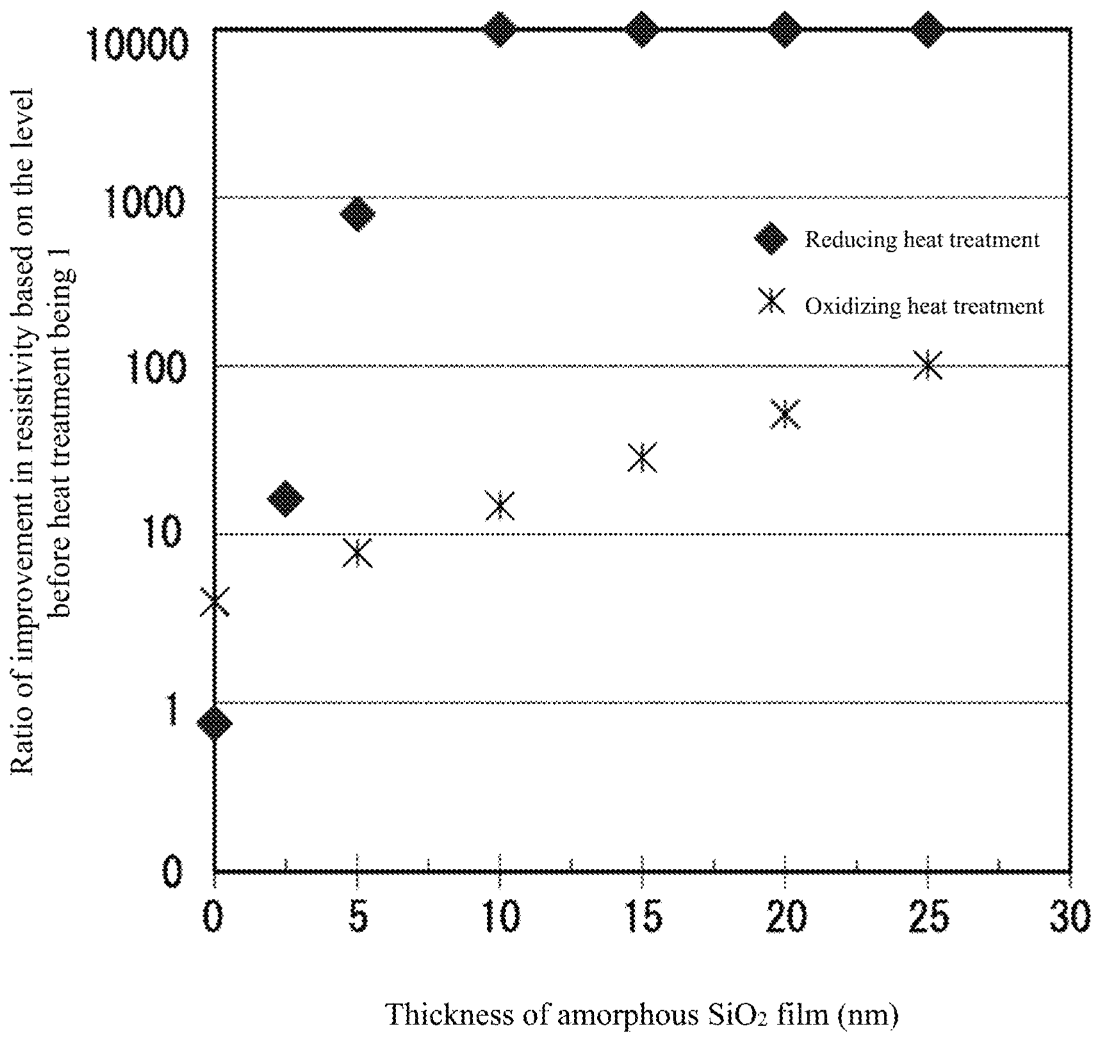
FIG. 10 is a graph showing experimental results illustrating the relationship between the thickness of the amorphous $SiO_2$ film and the resistivity of magnetic material.

Next, the inventors measured the resistivity of each of the magnetic powder samples using the same method. The results are shown in FIG. 10. In the figure, the horizontal axis indicates the thickness of the second oxide layer F12 (amorphous $SiO_2$ film), while the vertical axis represents the resistivity value of each magnetic powder sample based on the resistivity of the soft magnetic metal grain P1 (including the first oxide layer F11) before the pre-treatment (before the formation of the second oxide layer F12) being 1.

As shown in FIG. 10, the magnetic powder samples heat-treated in a reducing atmosphere exhibit a resistivity improvement with an increase in film thickness of the second oxide layer F12, with the resistivity improving by as much as 10000 times (measurement limit) at the film thickness of 10 nm or greater. On the other hand, the magnetic powder samples heat-treated in an oxidizing atmosphere show a gradual rise in resistivity with an increase in film thickness of the second oxide layer F12, but not to the extent achieved by the heat treatment in a reducing atmosphere. This is because, whereas a layer of oxide film of crystalline Fe and Si is formed while the second oxide layer F12 is taken in as the magnetic grains are oxidized when the heat treatment is applied in an oxidizing atmosphere, the second and third oxide layers F12, F13 remain in amorphous state when the heat treatment is applied in a reducing atmosphere. Another reason is that the resistivity rises further as the thickness of the second oxide layer F12 increases.

Figure 11:
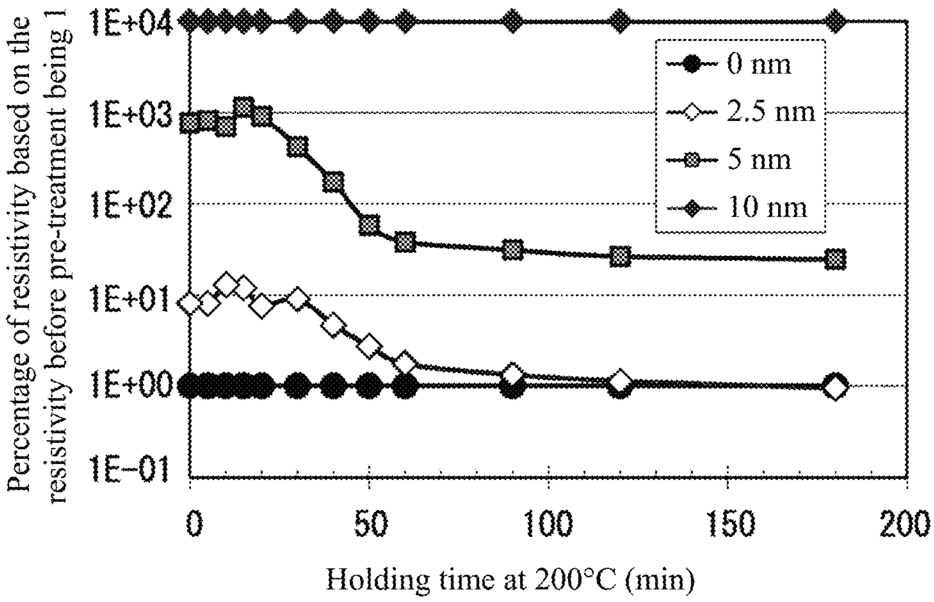
FIG. 11 is a graph showing experimental results illustrating how the resistivity of magnetic material changes over time under temperature load.

FIG. 11 shows experimental results of measuring how the resistivity of each magnetic powder sample heat-treated in a reducing atmosphere changes over time, by holding it in a thermostatic chamber controlled at 200° C. In the figure, the horizontal axis indicates the holding time, while the vertical axis indicates the ratio of the resistivity of each magnetic powder sample based on the resistivity of the soft magnetic metal grain P1 (including the first oxide layer F11) before the pre-treatment (before the formation of the second oxide layer F12) being 1.

As shown in FIG. 11, the magnetic powder samples of 2.5 nm and 5 nm in film thickness of the second oxide layer F12 undergo a deterioration in resistivity with an elapse of the holding time, and the resistivity of the magnetic powder sample with the film thickness of 2.5 nm drops to as low as the level of the magnetic powder sample with the film thickness of 0 nm. On the other hand, no deterioration in resistivity is observed with the magnetic powder sample of 10 nm in film thickness of the second oxide layer F12. This confirms that the resistivity does not deteriorate if the film thickness of the second oxide layer F12 is 10 nm or greater.

Based on the above results, the drop in the magnetic permeability of the magnetic grain 11 can be kept to 40% or less of the level before the pre-treatment (refer to FIG. 9), and any deterioration in resistivity can also be suppressed, by adjusting the film thickness of the second oxide layer F12 to 5 nm or greater but no greater than 25 nm. In addition, magnetic permeability equal to or greater than the magnetic permeability of a magnetic powder to which the first heat treatment is applied in an oxidizing atmosphere can be ensured (refer to FIG. 9), and stable insulation properties free from deterioration in resistivity can also be ensured, by adjusting the film thickness of the second oxide layer F12 to 10 nm or greater but no greater than 25 nm.

(Forming Step)

The magnetic member 100, 100' is produced by forming an aggregate of magnetic grains 11 to a prescribed shape and then applying heat treatment to it. The method for obtaining a formed compact is not limited in any way, and the pressure forming method, lamination method, or any other forming method may be applied as deemed appropriate.

Under the pressure forming method, material grains (magnetic grains 11) are agitated together with an optional binder and/or lubricant added to them, after which the mixture is formed to a desired shape by applying a pressure of 1 to 30 t/$cm^2$, for example. This method is applied when magnetic cores of coil-type chip inductors (refer to FIG. 6), like the one described above, are produced.

For the binder, any acrylic resin, butyral resin, vinyl resin, or other organic resin whose thermal decomposition temperature is 500° C. or below, can be used. Use of such organic resin makes the formed compact less prone to residues of the organic resin remaining on it after the heat treatment. The lubricant may be an organic acid salt or the like, where specific examples include stearic acid salt and calcium stearate, or the like. The amount of lubricant is 0 to 1.5 parts by weight relative to 100 parts by weight of material grains (magnetic grains 11), for example.

Under the lamination method, multiple magnetic sheets containing material grains (magnetic grains 11) are stacked together and then thermally pressure-bonded, to produce a multilayer body. This method is used for the production of multilayer inductors, etc. For the production of magnetic sheets, a magnetic paste (slurry) prepared beforehand is coated on the surface of plastic base films using a doctor blade, die-coater, or other coating machine. Next, the base films are dried with a hot-air dryer or other drying machine under the conditions of approx. 5 minutes at approx. 80° C. The multilayer body is cut to individual components of appropriate size using a dicing machine, laser processing machine, or other cutting machine.

(Second Heat Treatment)

In the second heat treatment, the formed compact produced as above is heated to a temperature of 700° C. or below for a prescribed amount of time in a reducing atmosphere or oxidizing atmosphere. The second heat treatment in a reducing atmosphere forms bonding parts V1 in the third oxide layer F13, as shown in FIG. 3, and consequently a magnetic member 100 constituted by many magnetic grains 11 that are bonded together via the bonding parts V1, is produced. Furthermore, crystallization of the third oxide layer F13 can be suppressed by implementing the second heat treatment in a reducing atmosphere. This way, a magnetic member 100 offering excellent dielectric strength can be manufactured.

On the other hand, the second heat treatment in an oxidizing atmosphere forms the fourth oxide layer F14 on the outer periphery of the third oxide layer F13, as shown in FIG. 4, primarily by the Fe diffusing from the third oxide layer F13 and oxygen supplied externally. Bonding parts V1 are formed because of the fourth oxide layer F14, and a magnetic member 100' constituted by many magnetic grains 11 that are bonded together via the bonding parts V1, is produced. In the second heat treatment in an oxidizing atmosphere, crystallization of the third oxide layer F13 can be suppressed to some extent as a result of formation of this fourth oxide layer F14. This way, a magnetic member 100' offering excellent strength, which exhibits a certain level of dielectric strength and has the bonding parts V1 where fourth oxide layers F14 are strongly bonded together, can be manufactured.

The reducing gas used in the second heat treatment may be hydrogen ($H_2$), carbon monoxide (CO), hydrogen sulfide ($H_2S$), etc., but hydrogen is preferred. Preferably the gas used for oxidization in the second heat treatment is standard atmosphere (air). The heat treatment furnace is not limited in any way, either, and any general sintering furnace, such as electric furnace, etc., may be applied. The heat treatment temperature, which is not limited in any way so long as it satisfies the temperature requirement for the formation of the bonding parts V1, is typically 700° C. or below. The treatment time can be set in any way as deemed appropriate according to the heat treatment temperature, such as 5 hours when the heat treatment temperature is 700° C.

The formed compact to which a binder and/or lubricant may have been added, may undergo a degreasing process before the second heat treatment. The degreasing treatment is implemented in an oxidizing atmosphere such as atmosphere, etc., under the conditions of approx. 1 hour at 500° C., for example. The degreasing process may be implemented using the same furnace as the one used for the second heat treatment, or it may be implemented using a different furnace. If the degreasing process is implemented using the same furnace as the one used for the second heat treatment, the ambient gas or heating temperature may be switched so that the degreasing process and the second heat treatment can be implemented successively.

It should be noted, while the aforementioned first heat treatment and second heat treatment are more effective when implemented as a series of successive treatments, only one of the heat treatments may be implemented. Although the temperature of the first heat treatment is higher than the temperature of the second heat treatment, the first heat treatment produces effectively no magnetic-grain-to-magnetic-grain bonding parts because the magnetic grains are flowing. As a result, the third oxide film F13 formed by the heat diffusion of Fe is formed, in a manner having a stable, uniform film thickness, primarily due to the first heat treatment characterized by higher temperature and flowing magnetic grains. This means that, when the following second heat treatment is implemented in a reducing atmosphere, strong bonding parts V1 can be formed on the foundation of the third oxide layer F13 already formed. If the second heat treatment is implemented in an oxidizing atmosphere, on the other hand, a more uniform oxide layer F14 can be formed because Fe is supplied from the third oxide film F13 already formed, and therefore, again, strong bonding parts V1 can be formed.

If the first heat treatment is not implemented, the pretreatment where the second oxide layer F12 is formed on the surface of the soft magnetic metal grains P1, is implemented in the material grain stage before the magnetic body (magnetic member 100, 100') is formed. Then, the soft magnetic metal grains P1 having the second oxide layer F12 formed on their surface, are put through a magnetic member-forming step based on the pressure forming method or lamination method, after which the formed compact is heated to the second heat treatment temperature (700° C. or below) for a prescribed amount of time. At this time, a degreasing process may be implemented before the second heat treatment, as necessary.

The second heat treatment, when implemented in a reducing atmosphere, forms the third oxide layer F13, and this layer forms the bonding parts V1. When the second treatment is implemented in an oxidizing atmosphere, the third oxide layer F13 is formed and then an oxide layer F14 whose primary components are Fe and O is formed on the outer periphery thereof, and this oxide layer F14 forms the bonding parts V1. The effect of stably and uniformly forming the third oxide layer F13 beforehand is not achieved because the first heat treatment has not been implemented. If both the first heat treatment and second heat treatment are implemented, bonding parts V1 that are stronger than those achieved by implementing the second heat treatment alone, can be formed. On the other hand, eliminating the first heat treatment allows for production of magnetic members meeting a certain standard at lower production cost.

It should also be noted that, after the magnetic grains 11 have been produced using the first heat treatment, the magnetic member need not be produced using a sintering step (second heat treatment). For example, the magnetic member may be constituted by a composite material produced by mixing and dispersing the magnetic grains 11 shown in FIG. 1, into an organic resin. In this case, the pre-treatment where the second oxide layer F12 is formed on the surface of the soft magnetic metal grains P1, is also implemented in the material grain stage before the magnetic body (magnetic member 100) is formed. Then, the soft magnetic metal grains P1 having the second oxide layer F12 formed on their surface, are heated to the first heat treatment temperature (900° C. or below) for a prescribed amount of time in a reducing atmosphere, which is then followed by a resin-molding step designed for creation of a magnetic member, to produce the magnetic member as described above. In the resin-molding step, the method used is not limited to the one described above; any of the various existing methods may be applied correspondingly as deemed appropriate. This way, a magnetic member of prescribed shape can be produced without the need for a sintering step.

Second Embodiment

Next, the second embodiment of the present invention is explained.

FIG. 12 is a cross-sectional view providing a schematic illustration of the structure of the magnetic grain 21 pertaining to this embodiment, while FIG. 13 is a schematic view explaining the layer structure of the multilayer oxide film of the magnetic grain 21.

The magnetic material in this embodiment is constituted by the magnetic grains 21 shown in FIG. 12. The magnetic grain 21 comprises a soft magnetic metal grain P2, and a multilayer oxide film F2 covering the surface of the soft magnetic metal grain P2.

The soft magnetic metal grain P2 is constituted by a soft magnetic alloy grain that contains at least Fe (iron). The soft magnetic alloy grain is an alloy that contains at least Fe, and two types of elements (elements L and M) that oxidize more easily than Fe. Element L is different from element M, and each is a metal element or Si. If elements L and M are metal elements, typically they are Cr (chromium), Al (aluminum), Zr (zirconium), Ti (titanium), or the like; however, preferably they are Cr or Al, and more preferably they contain Si or Zr. The elements that may be contained other than Fe and elements L and M include, among others, Mn (manganese), Co (cobalt), Ni (nickel), Cu (copper), P (phosphorus), S (sulfur), and C (carbon).

In this embodiment, the soft magnetic metal grain P2 is constituted by a FeCrSi alloy grain. The composition of the soft magnetic metal grain P2 is typically 1 to 5 percent by weight of Cr, and 2 to 10 percent by weight of Si, with Fe accounting for the remainder except for impurities, to a total of 100 percent by weight.

The multilayer oxide film F2 has a first oxide layer F21 of crystalline nature containing Fe, and a second oxide layer F22 of amorphous nature containing Si. The second oxide layer F22 is present between the surface of the soft magnetic metal grain P2 and the first oxide layer F21.

The multilayer oxide film F2 is formed by applying a pre-treatment similar to the one employed in the first embodiment, and a heat treatment (third heat treatment), to the soft magnetic metal grain P2.

In the pre-treatment step, a silicon oxide film of amorphous nature (amorphous $SiO_2$ film) that will constitute the second oxide layer F22 is formed on the surface of the soft magnetic metal grain P2. The method of pre-treatment is not limited in any way, and a coating process using the sol-gel method is employed in the mode pertaining to this embodiment. Under the sol-gel method, typically a treatment solution containing TEOS (tetraethoxy silane, $Si(OC_2H_5)_4$), ethanol, and water is mixed into a mixed solution containing material grains (soft magnetic metal grains), ethanol, and ammonia water, and then the mixture is agitated, after which the material grains are filtered out/separated and then dried; this way, a coating layer constituted by a $SiO_2$ film can be formed on the surface of the material grains.

In this embodiment, the aforementioned treatment solution is dripped, divided into multiple sessions, into the aforementioned mixed solution to mix the solutions, thereby forming a coating layer (amorphous $SiO_2$ film) that will constitute the second oxide layer F22, on the surface of the soft magnetic metal grain P2, while suppressing the homogeneous nucleation of $SiO_2$ grains.

In the third heat treatment step, the soft magnetic metal grains P2 having the second oxide layer F22 formed on them, are heated to a temperature of 400° C. or below for a prescribed amount of time in an oxidizing atmosphere. This way, Fe, which is a composition element of the soft magnetic metal grain P2, partly diffuses toward the surface of the second oxide layer F22, and the first oxide layer F21 of crystalline nature is formed as a result. By setting the heat treatment temperature to 400° C. or below, diffusion of Si and Cr, which are the other composition elements of the soft magnetic metal grain P2, can be suppressed, so that Fe alone can be selectively diffused.

As described above, magnetic grains 21 having the multilayer oxide film F2 are produced. The magnetic grains 21 thus produced are put through a forming step and a second heat treatment step, to produce a magnetic member constituted by an aggregate (sintered compact) of the magnetic grains 21. In the second heat treatment step, the formed compact of the magnetic grains 21 is heat-treated at a temperature of 700° C. or below for a prescribed amount of time, in an oxidizing atmosphere.

Figure 14:
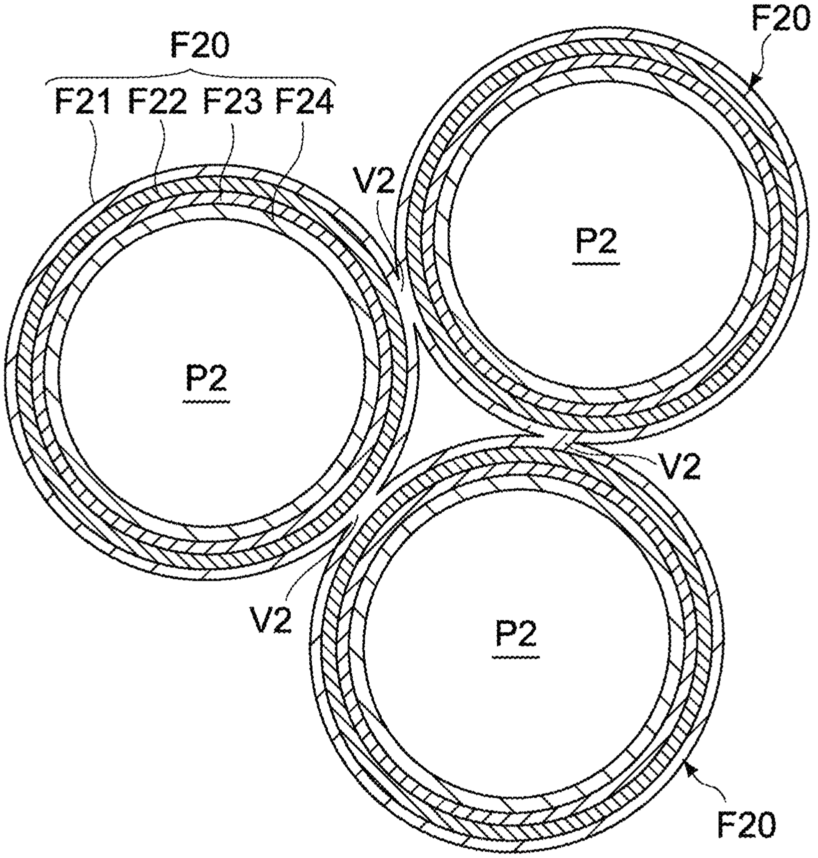
FIG. 14 is a cross-sectional view providing a schematic illustration of an example of microstructure of a magnetic member constituted by an aggregate of the magnetic material.
Figure 15:
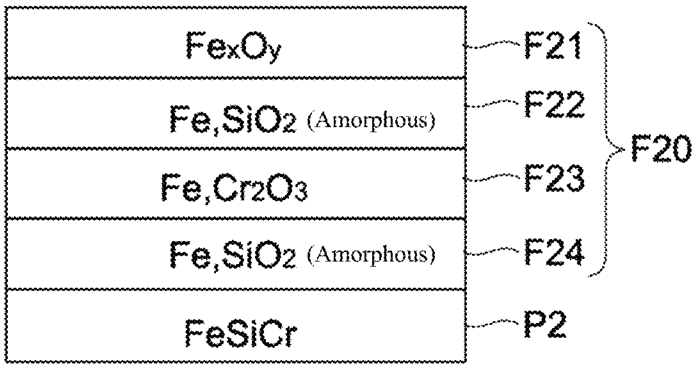
FIG. 15 is a schematic view explaining the structure of the multilayer oxide film in the magnetic material.

FIG. 14 is a cross-sectional view providing a schematic illustration of an example of microstructure of the magnetic member 200 constituted by an aggregate of the magnetic grains 21. FIG. 15 is a schematic view explaining the structure of the multilayer oxide film F20 of the magnetic member 200.

As shown in FIG. 14, the magnetic member 200 is constituted, as a whole, by an aggregate of many originally independent magnetic grains 21 that are bonded together, or a powder compact formed by many magnetic grains 21. FIG. 14 depicts areas near the interfaces of three magnetic grains 21 in a closeup view.

The adjacent magnetic grains 21 are bonded together primarily via the multilayer oxide film F20 present around each soft magnetic metal grain P2, to constitute a magnetic member 200 having a certain shape as a result. Some adjacent soft magnetic metal grains P2 may be bonded together via their respective metal parts. Regardless of whether they are bonded together via the multilayer oxide film F2, or via their respective metal parts, it is desirable that effectively no matrix constituted by organic resin is contained.

The multilayer oxide film F20 is constituted by an oxide film of four-layer structure that includes first to fourth oxide layers F21 to F24, where the fourth oxide layer F24, third oxide layer F23, second oxide layer F22, and first oxide layer F21 are formed, in this order, starting from the layer closest to the soft magnetic metal grain P2 (that is, from the inner side).

The first and second oxide layers F21, F22 in the multilayer oxide film F20 correspond to the first and second oxide layers F21, F22 in the multilayer oxide film F2 of the magnetic powder 21, respectively. The third and fourth oxide layers F23, F24 are oxide layers produced by the second heat treatment, and both are formed between the surface of the soft magnetic metal grain P2 and the second oxide layer F22.

The third oxide layer F23 is an oxide layer of crystalline nature containing Fe and Cr as the composition elements of the soft magnetic metal grain P2, whose representative component is typically $Cr_2O_3$. The fourth oxide layer F24 is an oxide layer of amorphous nature containing Fe and Si as the composition elements of the soft magnetic metal grain P2, whose representative component is typically $SiO_2$. The Cr contained in the third oxide layer F23, and Si contained in the fourth oxide layer F24, correspond to the diffused and deposited portions of the Cr and Si, respectively, each being a constitution component of the soft magnetic alloy grain P2.

Because the multilayer oxide film F20 is present, insulation property of the magnetic member 200 as a whole is assured. Presence of the multilayer oxide film F20 can be confirmed by composition mapping using a scanning electron microscope (SEM) at a magnification of approx. 5000 times. Presence of the first to fourth oxide layers F21 to F24 constituting the multilayer oxide film F20, can be confirmed by composition mapping using a transmission electron microscope (TEM) at a magnification of approx. 20000 times. Thicknesses of the first to fourth oxide layers F21 to F24 can be confirmed by a TEM energy dispersion X-ray analyzer (EDS) at a magnification of approx. 800000 times.

The magnetic member 200 has bonding parts V2 that bond the soft magnetic alloy grains P2 together, as shown in FIG. 14. A bonding part V2 is constituted by a part of the first oxide layer F21, and interconnects multiple soft magnetic alloy grains P2. Presence of the bonding parts V2 can be visually confirmed on a SEM observation image, etc., enlarged at a magnification of approx. 5000 times, for example. Presence of the bonding parts V2 improves the mechanical strength and insulation property.

Preferably the magnetic member 200 is such that, throughout its entire expanse, the adjacent soft magnetic alloy grains P2 are bonded together via the bonding parts V2; however, it may have some areas where the soft magnetic alloy grains P2 are bonded together in a manner not via the multilayer oxide film F20. Furthermore, the magnetic member 200 may have some areas having a state where neither the bonding parts V2 nor bonding parts other than the bonding parts V2 (bonding parts between soft magnetic alloy grains P2) exist and the soft magnetic alloy grains P2 are only in contact with or close proximity to each other physically. Furthermore, the magnetic member 200 may have voids.

The magnetic member 200 is produced as described above, but the third heat treatment can be omitted. In this case, a formed compact of the soft magnetic metal grains P2 on which the second oxide layer F22 has been formed through the pre-treatment, is produced in a forming step based on the pressure-forming method or lamination method, and then heat-treated at a temperature of 700° C. or below in an oxidizing atmosphere. This way, a magnetic member 200 on which the first oxide layer F21, third oxide layer F23, fourth oxide layer F24, and bonding parts V2 have been formed, can be produced.

The thickness of the second oxide layer F22 (coating layer) can be adjusted by the amount of TEOS contained in the treatment solution, and the greater the amount of TEOS, the thicker the obtained film becomes. The thickness of the second oxide layer F22 is not limited in any way, but preferably it is 1 nm or greater but no greater than 20 nm. If the thickness is smaller than 1 nm, the coverage of the second oxide layer F22 becomes poor and it becomes difficult to improve the insulation properties. If the thickness exceeds 20 nm, on the other hand, the filling rate of the soft magnetic alloy grains P2 drops and therefore the magnetic properties of the magnetic member 200 tend to drop.

Also, the thickness of the second oxide layer F22 may be equal to or greater than the thickness of the fourth oxide layer F24, or it may be smaller than the thickness of the fourth oxide layer F24. By setting the thickness of the second oxide layer F22 equal to or greater than the thickness of the fourth oxide layer F24, the insulation properties can be effectively increased compared to when there is no second oxide layer F22. Conversely, by setting the thickness of the second oxide layer F22 smaller than the thickness of the fourth oxide layer F24, any drop in magnetic properties (specific magnetic permeability, etc.) caused by the presence of the second oxide layer F22 can be suppressed.

In particular, the fourth oxide layer F24 is formed in a manner covering the entire surface of the soft magnetic alloy grain P2, and therefore preferably the magnetic body as a whole contains more element L (Si) than element M (Cr). Stable insulation property can be obtained due to the presence of the fourth oxide layer F24. In addition, the thicknesses of the second and fourth oxide layers F22, F24 can be reduced, while suppressing excessive oxidization, by adjusting the content of element M to between 1.5 and 4.5 percent by weight. It should also be noted that the first, second, third, and fourth oxide layers F21 to F24 obtained here are crystalline, amorphous in nature, crystalline and amorphous in nature, respectively. By alternately forming these film layers, each having a different nature, an oxide film having both insulation property and oxidization suppression effect is achieved, and consequently a magnetic body is obtained that presents high specific magnetic permeability while also having insulation property, without being thicker than necessary.

It should also be noted that, after the magnetic grains 21 have been produced using the third heat treatment, the magnetic member need not be produced using a sintering step (second heat treatment). For example, the magnetic member may be constituted by a composite material produced by mixing and dispersing the magnetic grains 21 shown in FIG. 12, into an organic resin. In this case, the pre-treatment where the second oxide layer F22 is formed on the surface of the soft magnetic metal grains P2, is also implemented in the material grain stage before the magnetic body (magnetic member 200) is formed. Then, the soft magnetic metal grains P2 having the second oxide layer F22 formed on their surface, are heated to the third heat treatment temperature (400° C. or below) for a prescribed amount of time in an oxidizing atmosphere, which is then followed by a resin-molding step designed for creation of magnetic member, to produce the magnetic member as described above. In the resin-molding step, any of the various existing methods may be used correspondingly as deemed appropriate. This way, a magnetic member of prescribed shape can be produced without the need for a sintering step.

The foregoing explained embodiments of the present invention; however, the present invention is not limited to the aforementioned embodiments, and it goes without saying that various modifications can be added hereto.

For example, the above embodiments were explained by citing examples where the magnetic member is a magnetic body constituting a magnetic core of a coil component or multilayer inductor; however, the present invention is not limited to the foregoing and it can also be applied to a magnetic body used in a motor, actuator, generator, reactor, choke coil, or other electromagnetic component.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-124346, filed Jun. 26, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A magnetic material comprising:

a soft magnetic metal grain containing Fe; and;

a multilayer oxide film which has a layered structure of a first oxide layer containing Fe more than Si and a second oxide layer containing Fe and Si throughout the second oxide layer wherein Si is more than Fe, and which multilayer oxide film covers a surface of the soft magnetic metal grain, wherein the first oxide layer is crystalline and the second oxide layer is amorphous, and the first and second oxide layers are in contact with each other, and have a continuous layered structure covering the surface of the soft magnetic metal grain, wherein the second oxide layer has a thickness of 1 nm to 30 nm, which is greater than a thickness of the first oxide layer, said multilayer oxide film further comprising:

a third oxide layer containing Fe and Cr, and a fourth oxide layer containing Fe and Si, wherein:

the third oxide layer is crystalline and the fourth oxide layer is amorphous, the fourth oxide layer, the third oxide layer, the second oxide layer, and the first oxide layer are layered outwardly in this order from the surface of each soft magnetic metal grain, and each soft magnetic metal grain is bonded to at least another soft magnetic metal grain by a bonding part which is constituted by a part of the first oxide layer.

2. The magnetic material according to claim 1, wherein the soft magnetic metal grain is a pure iron powder.

3. The magnetic material according to claim 1, wherein the soft magnetic metal grain is a soft magnetic alloy grain containing Fe, element L where element L is Si, Zr, or Ti, and element M where element M is not Si, Zr, or Ti, and oxidizes more easily than Fe.

4. An electronic component comprising a magnetic core constituted by an aggregate of the magnetic material according to claim 1.

5. The magnetic material according to claim 1, wherein the second oxide layer has a thickness of 5 nm to 25 nm.

6. The magnetic material according to claim 1, wherein the second oxide layer covers all around the surface of the soft magnetic metal grain.

7. The magnetic material according to claim 1, wherein the first oxide layer has a thickness of 0.5 nm to 10 nm.

* * * * *